United States Patent [19]

Liu et al.

[11] Patent Number: 4,864,444
[45] Date of Patent: Sep. 5, 1989

[54] LATCH FOR HIGH PERFORMANCE LINEAR ACTUATOR FOR MEMORY STORAGE DEVICE

[75] Inventors: Jeffrey Liu; Kai C. K. Sun; Shand-Ling Mao, all of San Jose, Calif.

[73] Assignee: Microscience Corporation, Sunnyvale, Calif.

[21] Appl. No.: 259,271

[22] Filed: Oct. 18, 1988

Related U.S. Application Data

[62] Division of Ser. No. 793,333, Oct. 31, 1985, abandoned.

[51] Int. Cl.$^4$ ............... G11B 5/54; G11B 5/55; G11B 21/22; G11B 21/08
[52] U.S. Cl. ..................................... 360/105; 360/106
[58] Field of Search ............................... 360/106, 105

[56] References Cited

U.S. PATENT DOCUMENTS

| | | | |
|---|---|---|---|
| 4,484,241 | 11/1984 | Brende et al. | 360/105 |
| 4,706,142 | 11/1987 | Hattori et al. | 360/105 |
| 4,725,907 | 2/1988 | Jue | 360/105 |
| 4,796,130 | 1/1989 | Shimanuki | 360/105 |

Primary Examiner—Robert S. Tupper
Attorney, Agent, or Firm—Townsend & Townsend

[57] ABSTRACT

A high performance linear actuator for a memory storage device includes a carriage having bearings at opposed sides thereof for engaging a pair of rail members. One of the pair of rail members is preloaded against the respective carriage bearings to provide structural stiffness and increased resonant frequency to the carriage assembly. Another set of bearings straddle a third rail member extending medially between the pair of rail members. An electromagnetic coil motor is secured to the carriage and disposed to engage an E-frame driving magnet, with the force vector of the coil extending parallel to the rail members and proximate to the center of gravity of the carriage assembly. A plurality of read/write heads is secured laterally adjacent to the electromagnetic assembly and extend toward the magnetic storage medium. The E-frame is closed at both ends to prevent flux leakage. An electronic latch under program control engages and immobilizes the carriage whenever the system is not operating.

2 Claims, 5 Drawing Sheets

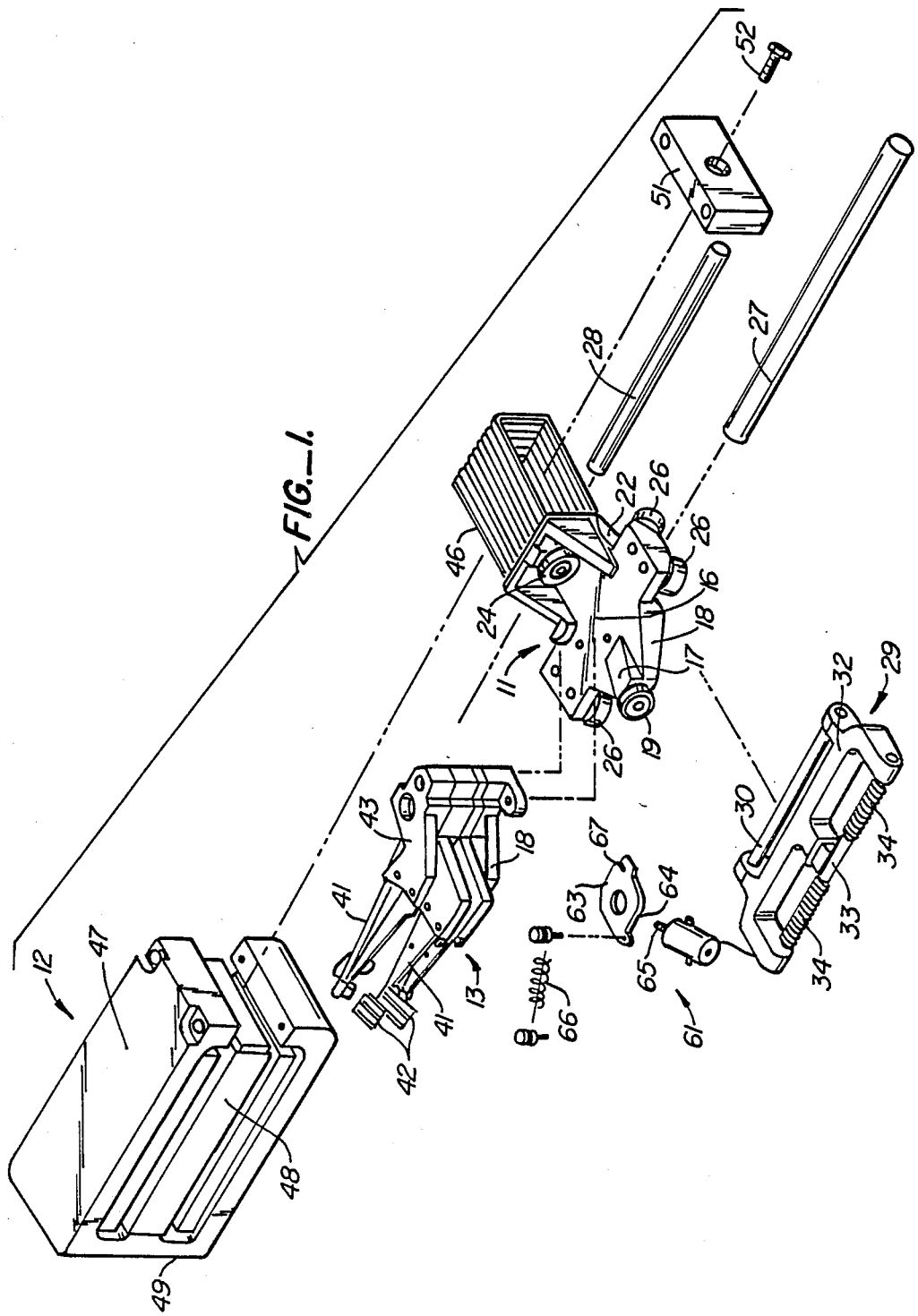
FIG.—1.

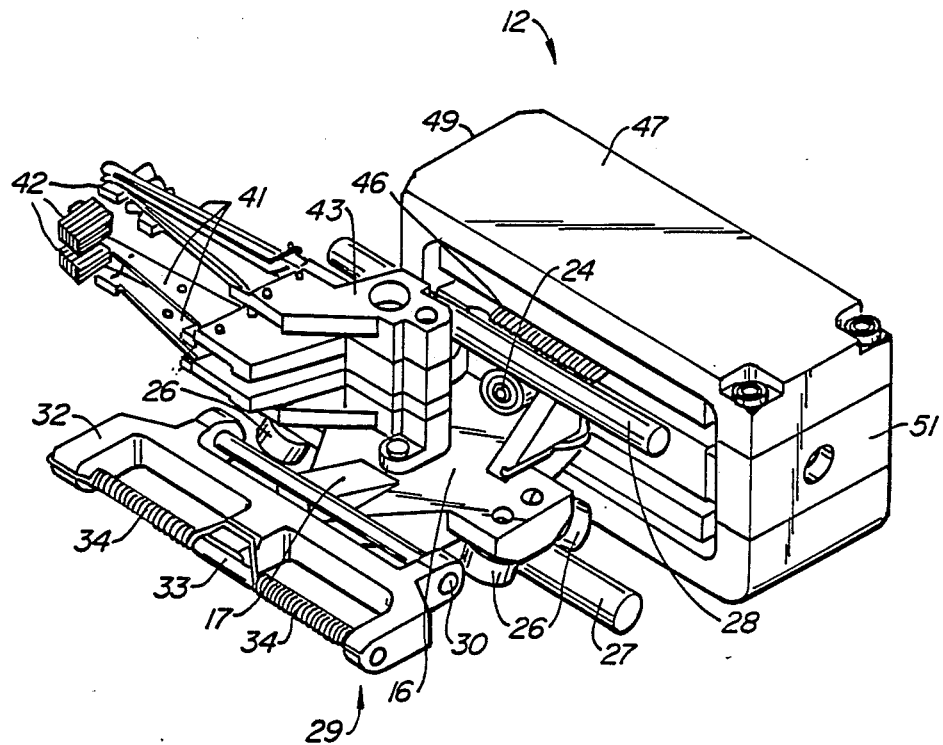
FIG._2.
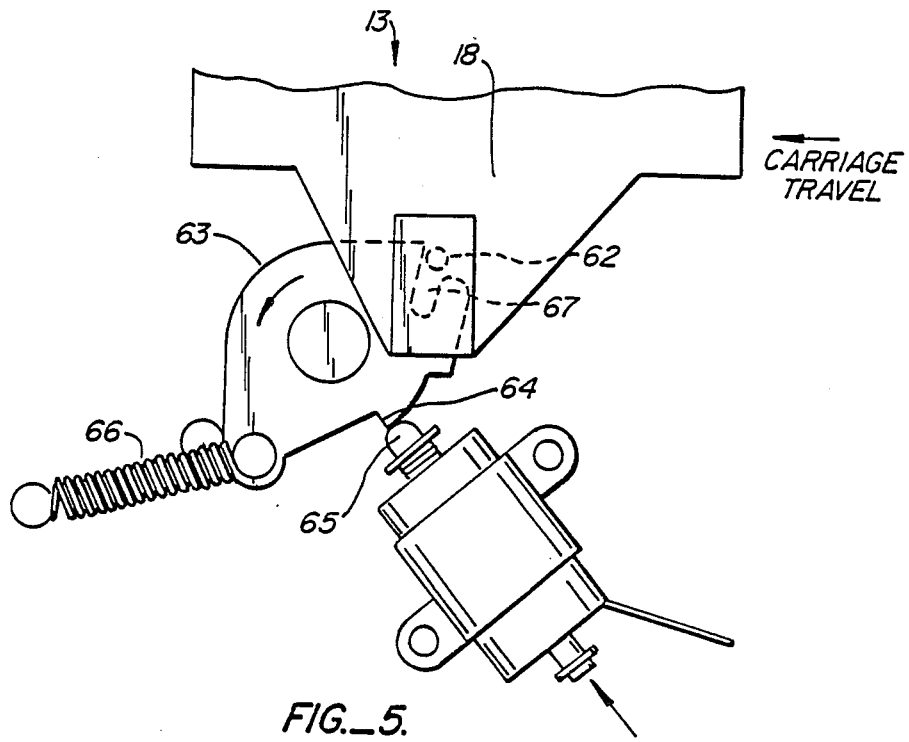
FIG._5.

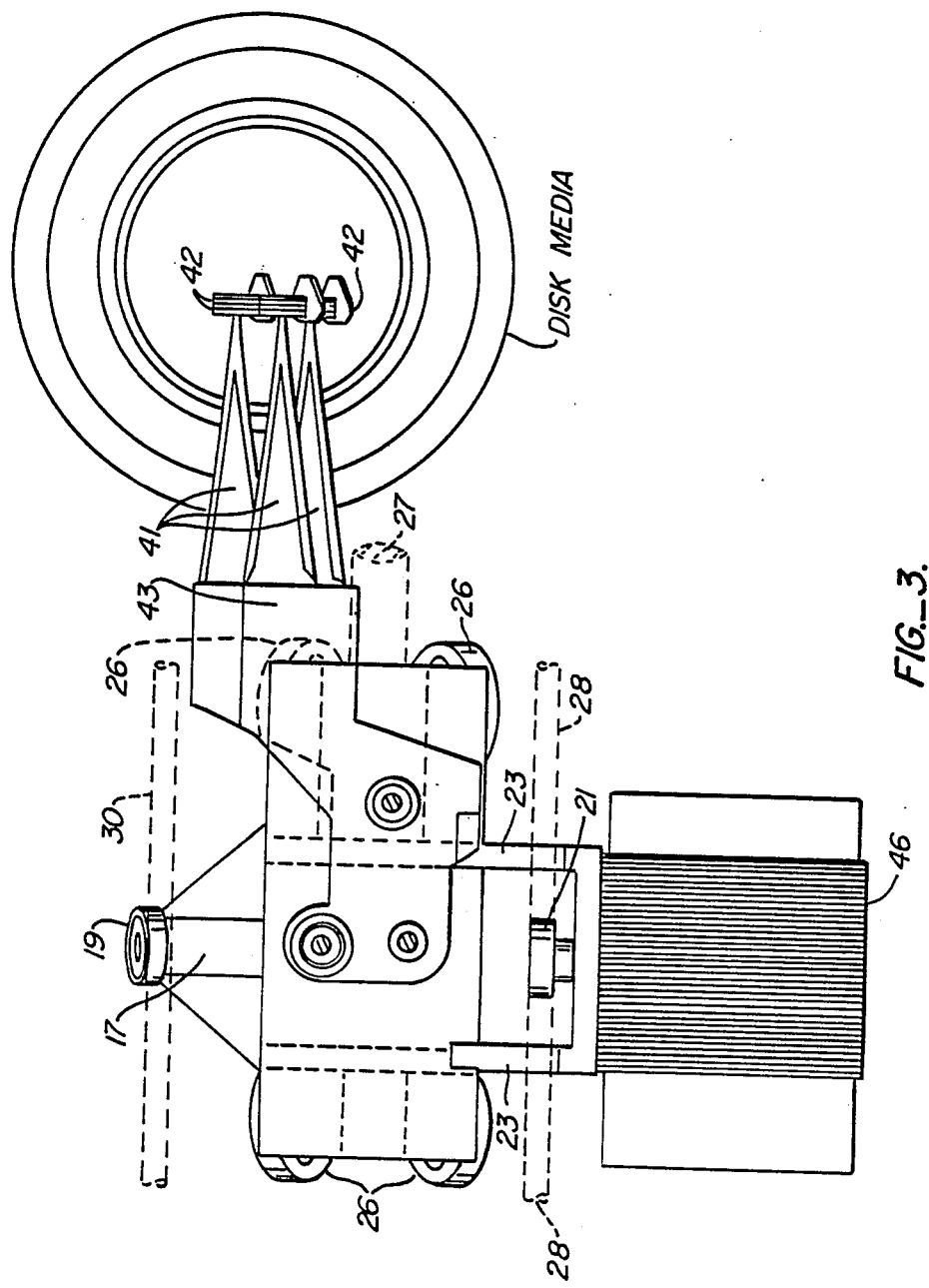

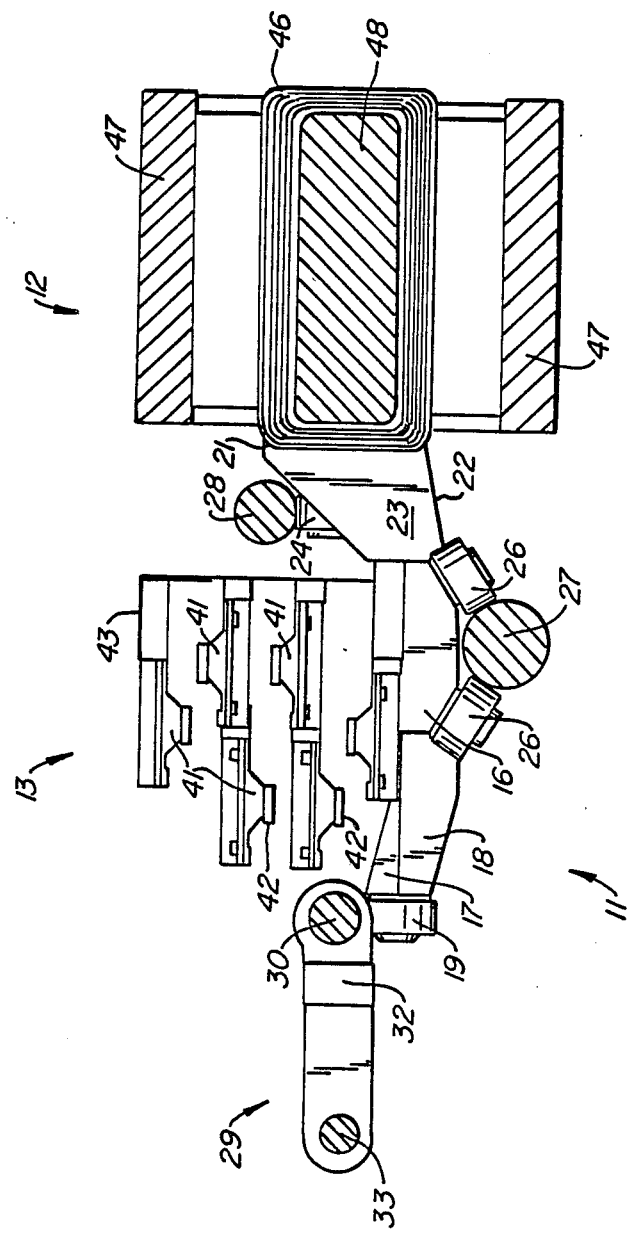
FIG._4.

LATCH FOR HIGH PERFORMANCE LINEAR ACTUATOR FOR MEMORY STORAGE DEVICE

This is a division of application Ser. No. 793,333 filed 10/31/85, now abandoned.

BACKGROUND OF THE INVENTION

The following United States Patents comprise the closest known prior art:

| | |
|---|---|
| 3,922,718 | 4,196,456 |
| 4,034,411 | 4,237,504 |
| 4,075,517 | 4,253,126 |
| 4,127,889 | 4,287,445 |
| 4,136,293 | 4,314,291 |
| 4,144,466 | 4,322,762 |
| 4,150,407 | 4,393,425 |
| 4,396,966 | 4,414,594 |
| 4,439,699 | 4,439,700 |
| 4,462,054 | |

In recent years the performance of disc-type magnetic data storage systems has been improved through improvements in two important areas: the increased density of data bits packed onto the disc surface, and reduced access time to drive the magnetic heads to a desired portion of the disc medium to read or write data thereon.

Generally speaking, the magnetic heads are driven linearly along the radius of the spinning disc to desired track locations on the disc. Although stepper motor arrangements are sufficient for low performance storage and retrieval systems, their inherent inertia, mechanical limitations, intrinsically limited positional resolution, and slow response time have prevented the use of these type of actuator drives in faster, high performance systems. To increase the linear speed of the head actuator assembly, disc drive designers have turned to voice coil drive systems which exhibit lower mass and higher driving force than the previous stepper motor arrangements. Such systems generally employ an electromagnetic voice coil slidably secured about the pole piece of a fixed magnet to generate the linear driving force. Indeed, such systems generally use a pair of driving coils spaced laterally on the carriage of the actuator assembly to provide balanced drive forces adjacent to the spaced apart side rails which support the carriage.

However, it has been found empirically that two coil drive systems or subject to vibration and resonance problems due to imbalances in the driving forces exerted by the paired coils. A slight change in the characteristics of one coil, due perhaps to heat, aging, or the like, can alter the magnetic output of that coil and the driving force generated thereby. When the forces of the two coils become unbalanced, the force couple resulting generates a torque which can disastrous effects on the actuator assembly. Thus, interest in electromagnetic drive systems has shifted to single coil arrangements which cannot suffer from such force imbalance problems.

In a single voice coil heat actuator device, it is desirable that the vector of the force generated by the coil be aligned through the center of gravity of the heat actuator assembly, so that no torque is applied to the assembly by the accelerating drive force of the coil. This vector alignment has generally been accomplished by the obvious approach of placing the mass comprised of the head arm assembly in linear alignment along the direction of the force vector of the coil. Thus, in the prior art devices the head arm assembly has extended from the carriage assembly along the axis of the voice coil. The net effect of this design approach is the creation of a carriage assembly which exhibits a relatively lengthy dimension along the axis of the coil. Due to the fact that the drive system is linear and aligned along the radius of the magnetic disc assembly, the overall length of the disc drive assembly of these prior art devices has been relatively large. This factor mitigates against the trend in the industry to design increasingly smaller disc drive systems with high performance and large storage capacity.

Another shortcoming in the prior art devices has been the E-frame magnetic drive structure itself. Generally speaking, in single coil carriage drive systems the end of the structure adjacent to the magnetic disc assembly has been open, so that the voice coil is permitted maximum translation along the core of the E-frame. However, in order to decrease the access time of the data storage system, it is necessary to increase the accelerating force by increasing the strength of the magnetic fields of the coil and the E-frame structure. Thus, higher driving forces applied to the carriage tend to require higher flux densities, and the presence of the open end of the E-frame adjacent to the magnetic discs poses the threat of increased data errors during the read/write operations.

It should also be noted that the voice coil type of carriage drive, unlike the stepper motor devices, provides no mechanical connection between the carriage and the base structure of the drive. Thus, when the coil is de-energized the carriage is relatively free to translate along the rails. During shipping and other movement of the system, the carriage can suffer damage through repeated impact against the mechanical stops generally employed at the limits of the carriage travel.

SUMMARY OF THE PRESENT INVENTION

The present invention generally comprises a high performance linear head actuating mechanism for use with a magnetic or optical disc data storage system. Some of the salient features of the invention include extremely fast data access and precise positioning of the read/write heads, and a mechanism which far more compact that those known in the prior art.

The high performance linear actuator includes a carriage having bearings at opposed sides thereof for engaging a pair of rail members. One of the pair of rail members is preloaded against the respective carriage bearings to provide structural stiffness and increased resonant frequency to the carriage assembly. Another set of bearings straddle a third rail member extending medially between the pair of rail members. An electromagnetic coil motor is secured to the carriage and disposed to engage an E-frame driving magnet, with the force vector of the coil extending parallel to the rail members and proximate to the center of gravity of the carriage assembly. A plurality of read/write heads is secured laterally adjacent to the electromagnetic assembly and extends toward the magnetic storage medium. The E-frame is closed at both ends to prevent flux leakage. Also, the carriage includes an electronically operated latching mechanism which, under program control, locks the carriage assembly in place relative to the base structure whenever the system is placed in a non-operational mode. The latch mechanism prevents head damage to free translation of the carriage during casual movement of the disc drive device.

BRIEF DESCRIPTION OF THE DRAWING

FIG. 1 is an exploded perspective view of the carriage assembly of the higher performance linear head actuator of the present invention.

FIG. 2 is a perspective view of the carriage assembly and E-frame magnetic structure of the high performance linear head actuator of the present invention.

FIG. 3 is a plan view of the high performance linear head actuator of the present invention.

FIG. 4 is a cross-sectional elevation of the linear head actuator, taken along line 4—4 of FIG. 3.

FIG. 5 is a schematic representation of the carriage latching mechanism of the linear head actuator of the present invention.

DESCRIPTION OF THE PREFERRED EMBODIMENT

The present invention generally comprises a high performance linear actuator which is adapted to translate a plurality of transducers along a linear path adjacent to one or more data storage devices, such as magnetic or optical rotating discs. With regard to FIGS. 1-4, the invention broadly includes a carriage assembly 11 adapted for linear translation, a fixed magnetic driving structure 12 disposed to operatively interact with the carriage assembly 11 for linear driving purposes, and a transducer head assembly 13 secured to the carriage assembly 11 and disposed to access data stored magnetically or optically on one or more rotating discs.

The carriage assembly 11 is generally comprised of a planar web member 16 extending laterally and formed of a light, rigid material. The web extends longitudinally in the direction of intended translation, and an outwardly tapered lobe 18 extends laterally from one side of the carriage. On one lateral surface of the lobe a ramped reinforcing lug extends laterally to the outer edge portion of the lobe 18. A precision roller bearing 19 is mounted in the distal end portion of the lobe 18, and is disposed to rotate about an axis which is generally perpendicular to the longitudinal direction of travel.

Extending in laterally opposed relationship to the lobe 18 on the opposite side of the web 16 is a generally rectangular lobe 22. A side wall 21 extends longitudinally along the distal edge of the lobe 22, and is disposed generally transverse to the plane of the web 16. A pair of tapered supporting end walls 23 join the web 16 and the side wall rigidly together. A precision roller bearing 24 is mounted in the side wall adjacent to the outer surface thereof, and disposed to rotate about one axis which is parallel to the axis of rotation of the roller bearing 19, and also transverse to the longitudinal direction of travel.

The carriage further includes two pair of roller bearings 26, each pair being disposed at opposite ends of the carriage assembly 11. Each pair is disposed in laterally opposed relationship and oriented to rotate about axes which diverge by an angle of 90° or slightly more. Furthermore, each pair of bearings 26 is disposed to receive therebetween a guide rail 27. The rail 27 is generally cylindrical in cross-section, and extends parallel to the longitudinal direction of travel. Each pair 26 straddles the rail 27 is supporting and guiding fashion. The rail 27 is secured fixedly to the supporting structure and base of the present invention, which is not shown for purposes of clarity in illustrating the more novel aspects of the invention.

The invention also includes another guide rail 28, aligned parallel with the rail 27 and offset to one side of the carriage assembly adjacent to the lobe 22. The roller 24 is disposed to engage the surface of the cylindrical guide rail 28 in supporting but not guiding fashion. Another cylindrical rail 30 aligned is precise parallel relationship with the rails 26 and 22; however, unlike the support rails described previously, the rail 30 is secured to an arm assembly 29 which is pivotable about a shaft 33. The shaft 33 is also aligned parallel to all the rails, and is fixedly secured to the rigid frame. A pair of springs 34 are secured about the shaft 33 and adapted to bias resiliently the rail 30 into engagement with the roller 19. This resilient loading force biases the roller 24 to maintain constant impingement on the rail 28.

It may be appreciated that the bearings 26 provide a high degree of longitudinal stability to the carriage assembly 11. With reference to FIG. 4, the carriage assembly is relatively free to rotate about the axis of the shaft 27. Indeed, the force of the springs 34 imparts a rotational torque to the carriage, and this rotational torque is opposed by the engagement of the roller 24 and the rail 28. Thus any force tending to cause rotational movement of the carriage assembly about the shaft 27 must first exceed the preloading force of the springs 34 before such movement can occur. In effect, this preloading-loading force increases the rigidity and intrinsic resonant frequency of the carriage structure, permitting higher operating speeds and higher acceleration forces.

The transducer head assembly 13 is fixedly secured to the lateral surface of the web 16, medially between the lobes 18 and 22. The assembly 13 includes a plurality of support arms 41 extending forwardly from a bracket 43, with one of plurality of transducer heads 42 secured to the forward end of each arm and disposed to operatively interact with one or more rotating data storage disks. In the preferred embodiment the heads 42 comprise magnetic read/write heads; indeed, as depicted in FIG. 4, the six heads are provided in groups of two to store and retrieve data from a trio of discs aligned in a stack and rotated in common. However, the present invention is not limited to any particular head arrangement, nor to the use of magnetic storage media and transducers.

The carriage assembly 11 is driven to translate linearly along the rails so that the transducer heads 42 may access concentric data tracks on the discs, and read or write data thereon. The driving component comprises an electromagnetic coil motor 46, a generally rectangular voice coil secured to the outer surface of the side wall 21 and extending laterally outwardly therefrom in cantilever fashion it may be appeciated that the cantilevered coil exerts a torque moment on the carriage about the shaft 27, and this moment is counteracted by the spring force of the preload shaft 30. The coil motor 46 is disposed so that the axis of the coil, and therefor the line of action (force vector) thereof, extends parallel to the rails and passes close to the center of the gravity of the overall carriage assembly, including the transducer assembly 13 secured thereto. Also, the nominal line of support of the carriage on the shaft 27 extends close to the center of gravity of the carriage. Thus the force vectors of the driving coil and the rolling resistances of the guiding bearings 26 impart very little force couple or torque to the carriage assembly while the carriage translates linearly along the rails. The virtual elimination of torque likewise eliminates lateral shifting of the carriage and, together with the preloading force of the assembly 29, provides extremely high accuracy in positioning the heads over the data tracks of the discs.

It should be noted that the transducer head assembly is disposed adjacent to the motor coil 46, rather than colinearly aligned with the coil axis, as is commonly known in the prior art. Thus the overall length of the carriage assembly is relatively smaller than prior art designs, and it is thus possible to provide the advantages of a single voice coil drive (high speed, high accuracy) in a compact disc drive assembly using smaller disc media; i.e., the preferred embodiment may be employed with 5¼ inch disc media, whereas single voice coil drives known in the prior art have been limited to eight inch disc media or larger.

The fixed magnetic structure 12 includes an E-frame 47, as is known in the prior art, secured to the fixed frame 23. The core 48 of the E-frame 47 is rectangular in cross-section, and is dimensioned to slidably received within the core of the coil 46. It may be appreciated that current passing through the coil 46 generates a magnetic field which interacts with the magnetic field of the E-frame 47 to drive the carriage assembly linearly along the rails, as in known in the prior art. It is significant that the closed end 49 of the E-frame 47 is disposed adjacent to the disc media, and the openable end is opposed and distal from the discs. Thus the magnetic circuit of the frame prevents flux leakage near the discs, and provides lowered data error rates in magnetic data storage systems. In addition, a plate 51 is secured to the openable end of the E-frame by means of a screw 52, so that even the distal end of the frame retains substantially all magnetic flux within the E-frame.

It may be noted that the carriage assembly is designed to translate along the rails within the minimum possible friction and mass, so that the transducer heads may be accelerated and moved to the desired position in the shortest possible time, and then decelerated and maintained at that position until the data handling operations has been completed on the disc or discs. However, when the coil 46 is deactuated for any length of time, the carriage assembly is free to translate along the rails, and the slightest movement of vibration applied to the exterior of the unit may cause movement of the carriage along the rails. Without the electronic circuitry operating to maintain the position of the carriage assembly, the carriage may strike the crash stops (not shown) which are typically provided. Repeated impingement on the crash stop may harm the carriage or the transducers. To eliminate this problem, the present invention provides a latch assembly 61 to immobilize the carriage assembly, under program control, whenever the disc drive system is switched off. As shown schematically in FIG. 5, the latch assembly includes a latch post 62 fixedly extending from the lobe 18, and a latch member 63 rotatably secured to the fixed frame of the device. A solenoid operated member 65 is secured to the frame and disposed to engage a latch detent 64 extending from the member 63. A spring 66 is connected between the frame and the member 63 to exert a rotational restoring force on the latter.

When the disc storage system is switched off, a program built in to the operating circuit of the device causes the carriage to be driven forward (in the direction of the arrow in FIG. 5), the pin 62 engaging a slot 67 in the member 63. At full rotation, the detent 64 of the member 63 is engaged by the member 65, preventing counterrotation of the member 63 or release of the pin 62. The system 61 thus immobilizes the carriage before the system is shut down. When the system is again switched on, the same program first operates the solenoid to release the engagement of the detent 64, and the member 63 is rotated by the restoring force of the spring 66 to release the pin 62 and the carriage. Thus the system is protected from shock during shipping, storage, handling, and even from casual impact during periods of disuse.

We claim:

1. In a transducer actuator assembly for a disk drive having a carriage supporting a head arm assembly, an improved latch mechanism for selectively immobilizing said carriage, comprising:
    a pin extending from said carriage;
    a rotatable latch member having a slot disposed to receive and engage said pin, said latch member being disposed so that impingement of said pin in said slot upon movement of said carriage rotates said latch member in a first direction;
    spring means connected to said latch member to resiliently oppose said rotation in said first direction;
    a detent stop formed on said latch member; and
    a solenoid actuator having a quiescent position disposed to engage said detent stop and prevent rotation of said latch member, said solenoid actuator being disposed to, when activated, release said detent stop and permit rotation of said latch member by said spring means and release said pin from said slot.

2. The latch mechanism of claim 1 wherein said latch member is located at a position of maximum forward travel of said pin and carriage toward a center of said disk drive.

* * * * *